United States Patent [19]
Bowling

[11] Patent Number: 5,149,231
[45] Date of Patent: Sep. 22, 1992

[54] COUNTERBORE

[76] Inventor: Roy E. Bowling, 1355 Harlan St., Lakewood, Colo. 80214

[21] Appl. No.: 811,733

[22] Filed: Dec. 23, 1991

[51] Int. Cl.⁵ .................. B23B 41/00; B23B 51/00
[52] U.S. Cl. ................................ 408/82; 7/161; 408/201; 408/227
[58] Field of Search .......... 408/79, 80, 81, 82, 408/200, 227, 201, 230, 1 R; 7/161

[56] References Cited
U.S. PATENT DOCUMENTS

| | | | |
|---|---|---|---|
| 597,750 | 1/1898 | Smith | 408/230 |
| 3,611,549 | 10/1971 | Pope | 408/1 R |
| 3,697,188 | 10/1972 | Pope | 408/1 R |

Primary Examiner—Daniel W. Howell
Attorney, Agent, or Firm—Ralph F. Crandell

[57] ABSTRACT

A counterbore for enlarging an existing hole in the presence of a wire having an end extending through the hole. The counterbore includes a twist drill bit of a size of the enlarged hole to be drilled, a shank at the rear end of the bit for engagement with a drill chuck, and a pilot shank extending from the cutting end of said bit. A swivel is mounted at the leading end of the pilot for engagement with the wire during counterbore drilling. The swivel and pilot guides the wire into the hole without twisting during drilling of the counterbore and extracts the wire from the counterbore as the twist drill bit and pilot shank is withdrawn.

2 Claims, 3 Drawing Sheets

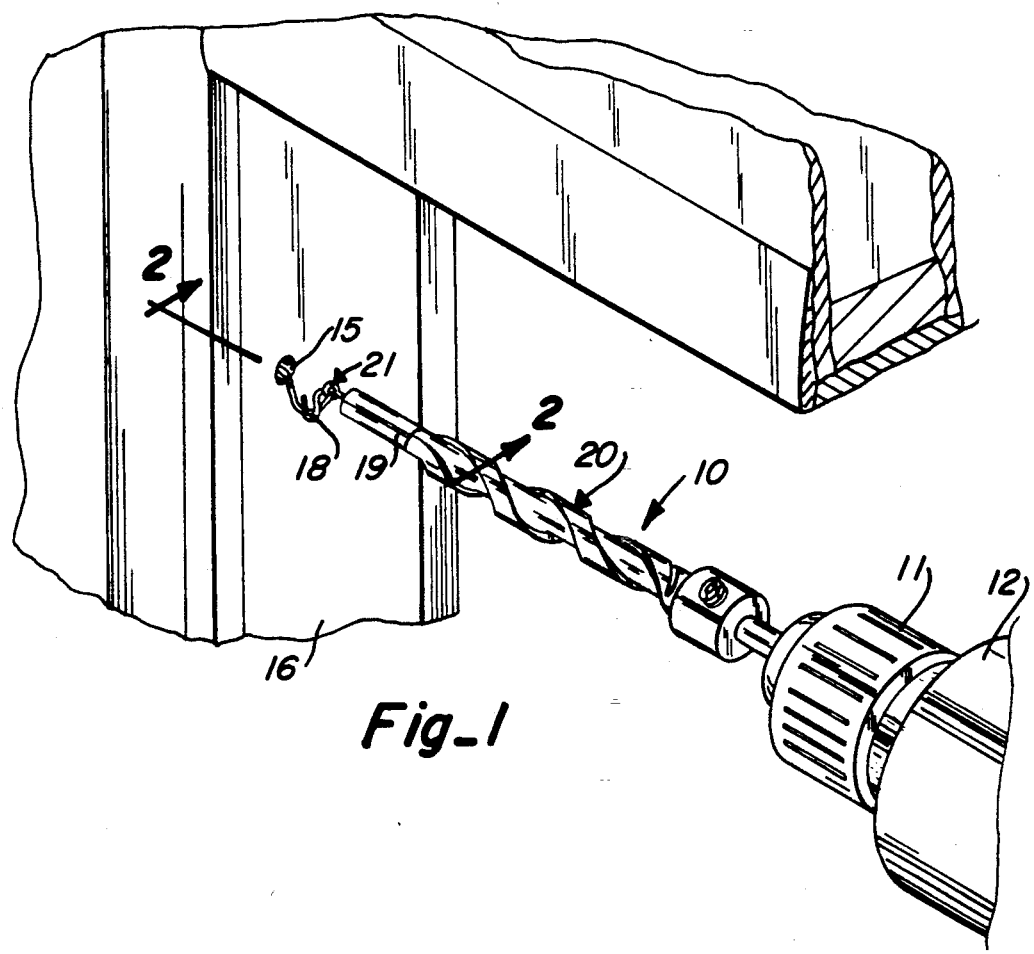
Fig_1
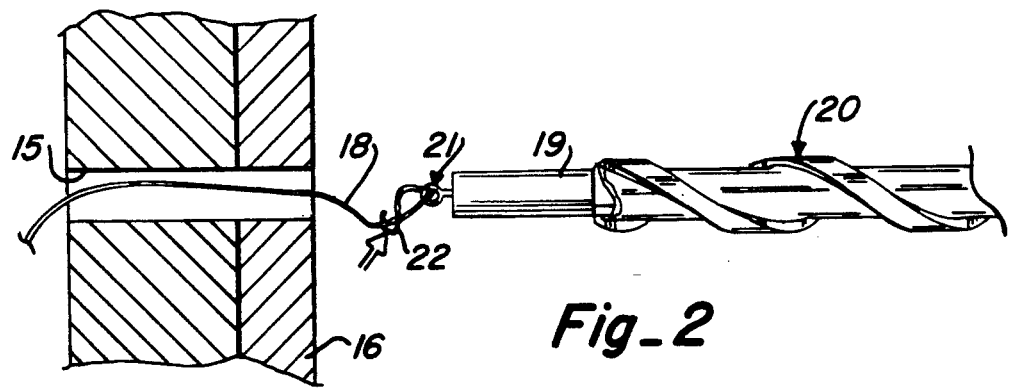
Fig_2
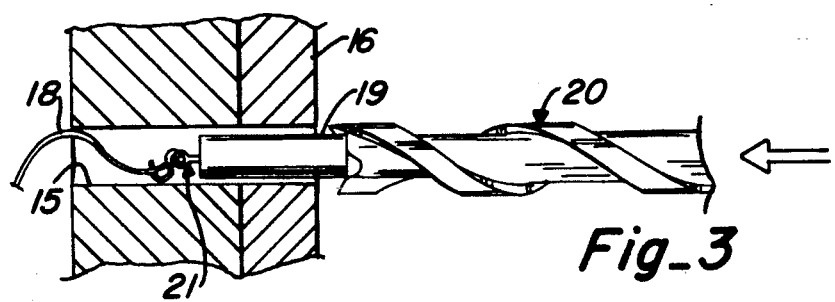
Fig_3

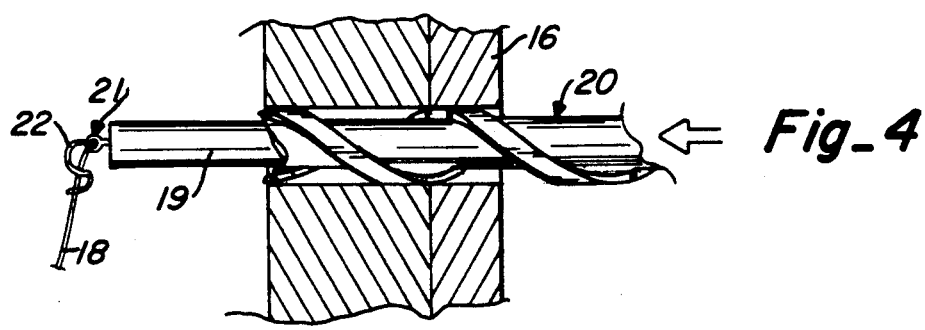
Fig_4
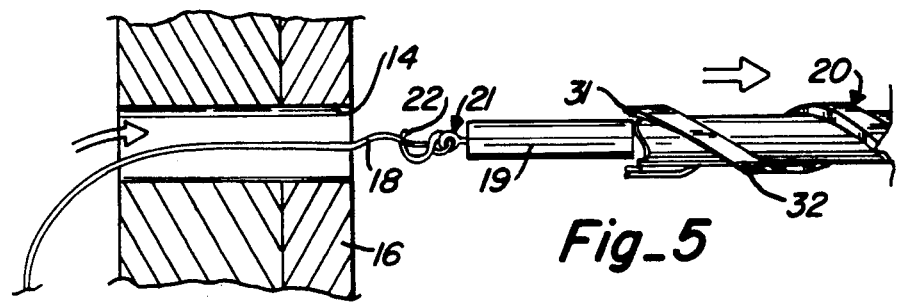
Fig_5
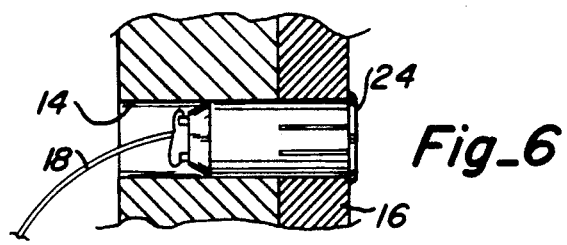
Fig_6
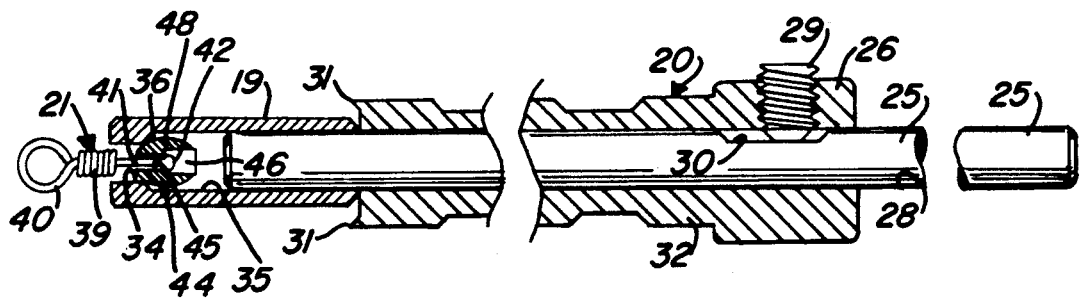
Fig_7

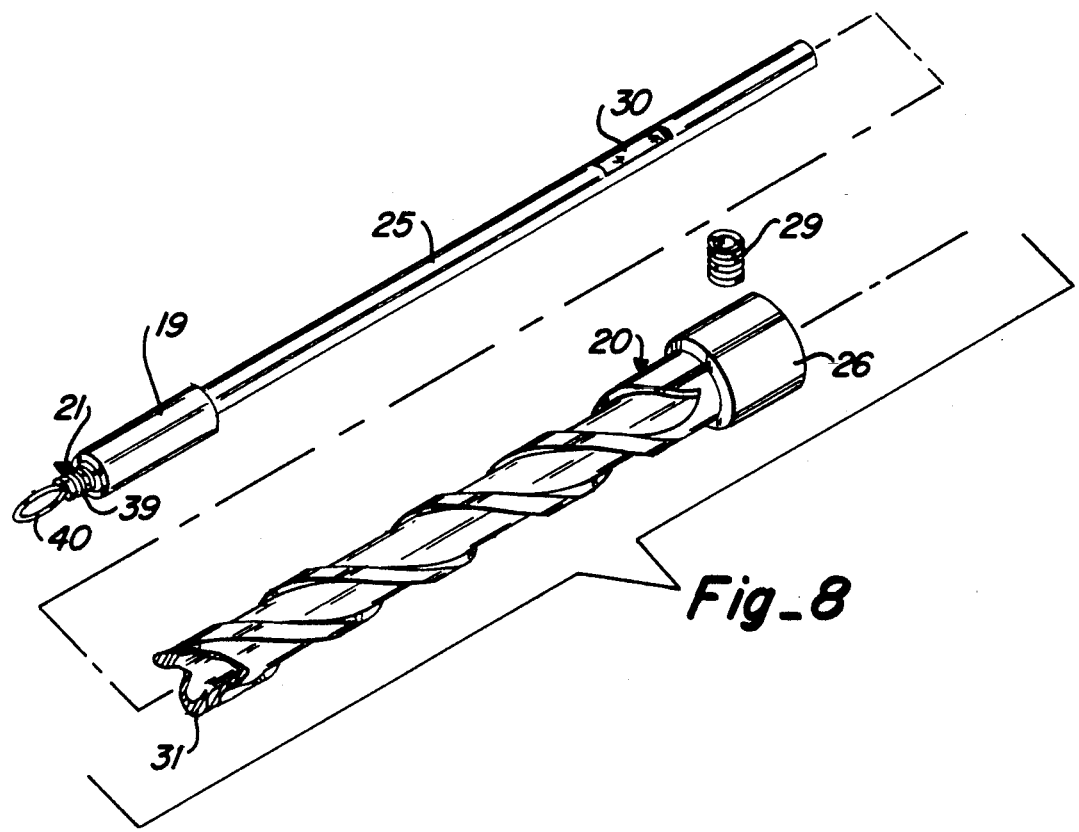
Fig_8
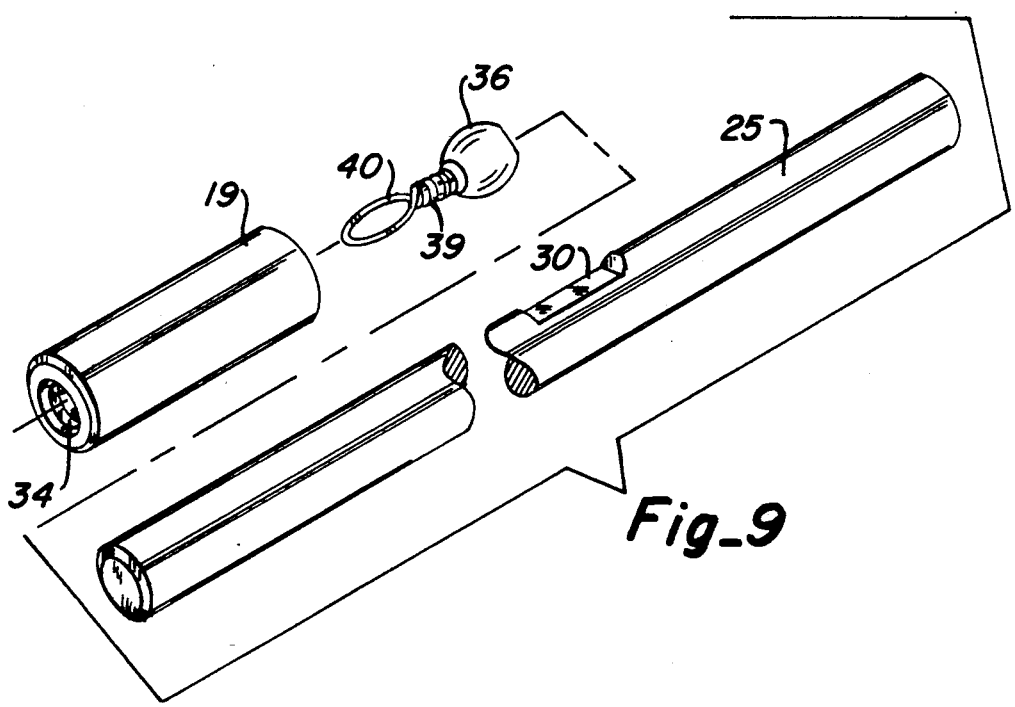
Fig_9

COUNTERBORE

BACKGROUND OF THE INVENTION

1. Field of the Invention

The present invention relates to drill bits and more particularly, to counterbore drill bits adapted to enlarge an existing hole.

2. Description of the Prior Art

When installing safety alarms, such as intrusion alarms, it is conventional practice to mount alarm sensors in wooden or metal frames. While many of these alarm systems are prewired at the time of the construction of the building, when expanding or updating a system, it often becomes necessary to enlarge a hole through which an end of an existing wire extends. If the wire is pushed back through the hole, it often drops between studs or framing, thereby creating difficult retrieval problems requiring that the wire be fished from a substantially inaccessible location. Any attempt to enlarge a hole while the wire extends through the hole necessarily results in substantial damage to or cutting of the wire. The drilling of a second hole adjacent the first not only requires that the wire be fished from the first hole, but also leaves the unsightly first hole.

OBJECTS OF THE INVENTION

It is the principal object of the present invention to provide an improved tool in the form of a counterbore drill bit which may be utilized to enlarge a hole through which an end of a wire extends without damaging or losing the wire.

Another object of the present invention is to provide an improved counterbore which is capable of drilling an accurate counterbore in the presence of a wire.

Another object of the present invention is to provide an improved counterbore tool which finds particular, but not necessarily exclusive utility in the intrusion alarm industry.

A further object of the present invention is to provide an improved counterbore drill bit which can be used to enlarge a hole through which a wire extends without cutting or damaging the wire.

A further object of the present invention is to provide a counterbore drill bit which is readily sharpenable to maintain its cutting edge.

A further object of the present invention is to provide a counterbore tool of the foregoing characteristics which is suitable for use in either a hand drill or a power drill.

Other objects of the present invention will become apparent from the following description and accompanying drawings.

SUMMARY OF THE INVENTION

The present invention is embodied in a counterbore drill bit for enlarging a hole through which a wire extends. The counterbore drill bit or tool, comprises a shank having a twist drill bit formed thereon, preferably in the form of a double twist bit. At the cutting edge of the drill bit, the shank extends forwardly to provide a counterbore pilot. At the rear of the drill bit tool, the shank extends an amount sufficient for engagement in a chuck of a hand drill tool or a power drill tool.

For purposes of engaging an end of a wire which extends through the hole to be enlarged, and for retaining said wire without twisting, the drill bit includes a pilot shank having at its forward end a rotary eyelet or swivel to which the end of the wire may be secured. With the rotary eyelet or swivel, as the drill bit rotates, the swivel allows the wire to maintain a stationary position and thus precludes twisting of the wire, while simultaneously pushing the wire back through the hole as the hole is enlarged, and then pulling the wire back through the enlarged hole.

An improved swivel mounting has been provided which reduces the chances of jamming or twisting the wire secured to the swivel eyelet. To this end, the swivel includes an eyelet with a twisted wire body and a headed stem or pin which is rotatably engaged with a ball mounting and retained therein by a headed portion on the inserted end of the stem. The ball is seated against a seat interiorly of a sleeve with the swivel head extending outwardly through a bore in the end of the sleeve. The sleeve, in turn, is secured to the drill bit shaft or shank and the exterior portion of the sleeve defines the counterbore pilot. The drill bit is formed as an exteriorly fluted sleeve with a cutting edge at its forward end. The sleeve is mounted on the drill bit shaft or shank with the shaft or shank extending from the rear portion of the sleeve a length sufficient for engagement in the chuck of a hand tool or power tool.

With the foregoing construction, the relative size of the counterbore drill bit and pilot can be changed at will, thereby making the tool suitable for use in a variety of applications and with a variety of hole sizes and counterbore sizes.

Other objects and advantages of the present invention will become apparent from the following description and drawings.

DESCRIPTION OF THE DRAWINGS

FIG. 1 is a perspective view of a counterbore drill bit embodying the present invention showing its application in enlarging a hole in a frame through which wires extend, and its mounting in the chuck of a drilling tool.

FIG. 2 is a section view taken substantially in the plane of 2—2 on FIG. 1 and showing a wire extending through an existing or original hole in a wooden frame with the end of the wire being engaged by the counterbore bit embodying the present invention.

FIG. 3 is a section view similar to FIG. 2, but showing the wire secured to the drill bit and the counterbore pilot inserted in the existing hole in the frame.

FIG. 4 is a view similar to FIG. 3, but showing the counterbore drill bit after it has drilled a counterbore in the frame.

FIG. 5 is a view similar to FIG. 4, but showing the drill bit retracted from the counterbore with the wire being pulled back through the bore.

FIG. 6 is a view similar to FIG. 5, but showing a sensor secured to the wire and mounted in the counterbore.

FIG. 7 is an enlarged longitudinal section view taken through a counterbore drill bit embodying the present invention.

FIG. 8 is an exploded view of a counterbore drill bit embodying the present invention showing the drill shank, fluted sleeve and swivel construction.

FIG. 9 is a perspective exploded view of the shank and swivel portion of the drill bit shown in FIG. 8.

DESCRIPTION OF THE PREFERRED EMBODIMENT

The present invention, as shown in the drawings, is embodied in a counterbore drill bit 10 which is capable, when mounted in a chuck 11 of a power or hand drill 12, of drilling a counterbore 14 corresponding to an existing hole or bore 15 in a frame 16 or other structure and in the presence of an existing wire 18, the end of which extends through the existing hole 15. The purpose of the counterbore drill bit 10 embodying the present invention is to provide an accurately drilled counterbore through an existing hole while at the same time preventing a wire 18 extending through the hole from being cut, twisted, or lost. To this end, the counterbore drill bit includes a pilot shank 19 at the forward or cutting end of a double twist counterbore drill bit 20, the pilot shank 19 being sized to fit loosely within the existing hole 15 for guiding the counterbore drill bit to accurately drill the counterbore hole 14.

In order to handle and protect the wire 18 one end of which extends through the existing hole 15, the pilot shank 19 includes, at its forward end, a swivel 21 adapted to engage the free or cut end 22 of the wire 18 and retain the wire in association with the counterbore drill bit as the counterbore hole 14 is being drilled. The swivel prevents the wire 18 from being twisted and simultaneously pushes the wire back through the existing hole 15 during the drilling operation. The swivel further retains the wire when the counterbore has been completed and prevents it from falling into a void in the partition, panel, or structure. Upon retraction of the counterbore drill bit following drilling of the counterbore 14, the wire 18 is pulled back through the hole and may be subsequently secured to an appropriate electrical or electronic device 24 mounted on the frame 16 in the counterbore 14 as shown in FIG. 6.

In order to provide for the efficient drilling of a counterbore while protecting existing wiring, the present invention contemplates an improved double twist drill bit counterbore 20, bore pilot 19, and swivel 21 mounted on a drill shank or shaft 25 securable in a chuck 11 of a drilling tool. For this purpose, the counterbore drill bit 20 is formed as a sleeve 26 having a central bore 28 therethrough of a size providing a close sliding fit with the drill shank 25. For securely retaining the counterbore sleeve 26 on the shaft 25, there is provided a set screw 29 threadably engaged with the sleeve 26 and extending into a slot 30 defined in the shank 25.

The forward cutting end of the counterbore sleeve drill bit 26 defines sharpened cutting edges 31 at the forward cutting end of drill flutes 32. The counterbore bit preferably includes two flutes 32 thereby providing a double twist drill. The counterbore sleeve drill bit 26 is readily removable from the shank 25 for sharpening.

At the cutting end of the counterbore bit 26, the drill shank 25 mounts the pilot sleeve 19 and swivel 21 contained therein. To this end, the pilot sleeve 19 defines an inner bore 34 at its forward end and an enlarged counterbore 35 rearwardly thereof and defining with the front bore 34 an internal shoulder 36. The pilot sleeve counterbore 35 is of a size adapted to receive the forward end of the drill shank 25 with a force fit, thereby securely mounting the pilot sleeve 19 on the drill shank 25, as shown in FIGS. 7 and 8. The forward end of the pilot sleeve 19 is chamfered for ease of insertion within the existing hole.

The swivel 21 is loosely, rotatably, and slidably mounted at the forward end of the pilot sleeve 19, as shown in FIGS. 7 and 8. To this end, the swivel 21 is formed by a stiffly bendable wire having a twisted end forming a body 39 and eye 40 at one end of a shank or rod 41, the opposite end of which shank or rod 41 is formed with a head 42. The headed swivel shank is secured in a swivel ball 44 having a bore 45 therethrough opening into a counterbore 46 defining an internal shoulder 48. The swivel shank 41 is loosely received in the bore 45 and counterbore 46 of the swivel ball 44. The swivel ball 44 is in turn seated on the internal shoulder 36 defined in the pilot sleeve 19. With this construction, the swivel is universally pivotable and twistable within the pilot sleeve, thereby precluding twisting or jamming of a wire engaged in the swivel eye 40 while the pilot sleeve 19 and counterbore drill bit 20 are rotated to drill the counterbore hole.

The swivel body 43 is formed by a plurality of twists of the end of the swivel wire about the wire shank 41. The body 43 prevents the swivel from excessive angular movement within the pilot sleeve bore 34 which could cause jamming of the wire in the hole or counterbore.

With the foregoing construction, it is a simple matter to drill a counterbore corresponding to an existing hole through which a wire end extends. For this purpose, the wire end is secured to the swivel eye 40 at the end of the counterbore pilot 19. As the counterbore is drilled, the wire is pushed back into the hole, but retained by the swivel. When the counterbore is completed, extraction of the counterbore bit retrieves the wire. The wire may then be secured to any appropriate electrical or electronic device adapted to be mounted in the counterbore.

While a certain illustrative embodiment of the present invention has been shown in the drawings and described above in considerable detail, it should be understood that there is no intention to limit the invention to the specific form disclosed. On the contrary, the intention is to cover all modifications, alternatives, equivalents, and uses falling within the spirit and scope of the invention as expressed in the appended claims.

I claim:

1. A counterbore for enlarging an existing hole in the presence of a wire having an end extending through said hole, said counterbore comprising a twist drill bit of a size of the enlarged hole to be drilled, said bit having a shank at the rear end thereof for engagement with a drill chuck, a pilot shank extending from the cutting end of said bit, said pilot shank being approximately the size of said existing hole and adapted to extend therethrough during drilling for guiding said twist drill bit, and a swivel at the leading end of said pilot adapted for engagement with said wire during counterbore drilling, whereby said wire is guided into said hole without twisting during drilling of the counterbore and extracted from said hole when said twist drill bit and pilot shank is withdrawn from said counterbore.

2. A counterbore for enlarging an existing hole in the presence of a wire having an end extending through said hole, said counterbore comprising a twist drill bit of a size of the enlarged hole to be drilled, said bit having a shank at the rear end thereof for engagement with a drill chuck, a pilot shank extending from the cutting end of said bit, said pilot shank being approximately the size of said existing hole and adapted to extend therethrough during drilling for guiding said twist drill bit, and a swivel at the leading end of said pilot adapted for engagement with said wire during counterbore drilling, said pilot shank comprising a sleeve defining a bore therethrough, a counterbore extending partly through said sleeve and defining an internal shoulder therein, a swivel comprising a swivel eye integral with a swivel shank, a swivel ball, said ball defining a bore therethrough for loosely rotatably receiving said swivel shank, said ball defining a counterbore extending partly therethrough and defining an internal shoulder therein, a head on said swivel shank engagable with said ball shoulder for holding said ball on said swivel shank, said ball rotatably engaging said pilot sleeve internal shoulder when said swivel is positioned in said pilot bore with said swivel eye extending from the forward end of said pilot shank for engagement by the end of the wire, whereby said wire is guided into said hole without twisting during drilling of the counterbore and extracted from said hole when said twist drill bit and pilot shank is withdrawn from said counterbore.

* * * * *